United States Patent [19]

Afanasiev et al.

[11] 3,920,402
[45] Nov. 18, 1975

[54] PHOTOCOLORIMETRIC GAS ANALYZER

[76] Inventors: Nikolai Gavrilovich Afanasiev, Bolshaya Cherkizovskaya ulitsa, 6, korpus 4, kv.52; Valery Leonidovich Zaitsev, Khibinsky proezd, 20v; Vladimir Petrovich Kruglov, ulitsa Kominterna, 20/2, kv.24, all of Moscow, U.S.S.R.

[22] Filed: May 16, 1974

[21] Appl. No.: 470,551

[52] U.S. Cl. .............. 23/254 E; 23/255 E; 356/209
[51] Int. Cl.² .................. G01N 21/48; G01N 31/22
[58] Field of Search........... 23/254 E, 254 R, 255 E, 23/255 R, 232 E, 232 R; 356/209

[56] References Cited
UNITED STATES PATENTS

| | | | |
|---|---|---|---|
| 2,787,782 | 4/1957 | Rosenblum et al. | 23/255 R X |
| 3,681,027 | 8/1972 | Smith | 23/254 R X |
| 3,754,867 | 8/1973 | Guenther | 23/232 R X |

Primary Examiner—Robert M. Reese
Attorney, Agent, or Firm—Waters, Schwartz & Nissen

[57] ABSTRACT

A photocolorimetric gas analyzer based on a sensitive element, comprising a radiation source whose electromagnetic radiation is received by the sensitive element which is made in the form of a gas-impermeable tablet containing a selective reagent and an inert filler, which changes the optical properties of its surface layer as a result of the reaction of one of the components of the gas mixture being analyzed and the reagent; a radiation detector to receive the radiation reflected by the surface layer; and means for mechanically removing the latter.

1 Claim, 8 Drawing Figures

PHOTOCOLORIMETRIC GAS ANALYZER

The present invention relates to gas analyzers based on determining the changes in the optical properties of a sensitive element under the effect of the medium being analyzed, and more specifically it relates to photocolorimetric gas analyzers designed to measure the concentration or the concentration effect dose of toxic and aggressive gases.

Known in the prior art are various devices and instruments for this purpose, called photocolorimetric gas analyzers.

In tape-type gas analyzers the indicating tape, impregnated with a reagent and dried, is moved continuously or intermittently in the zone of chemical reaction by means of a tape-transport mechanism (dry-tape instruments). After or during exposure to the analyzed air in the reaction zone the tape is photometered by a photodetector. The results of photometering are registered by an electric system and various signal or recording devices.

The disadvantages of these instruments are large size, heavy weight and low reliability caused by the use of a complicated tape-transport mechanism comprising a number of electromechanical units and parts, viz., electric motor, speed reducer, hold-down assembly, driving rollers, cams, springs, levers, switches, cassettes, etc.

Also known are tape-type gas analyzers wherein the reagent is contained in a special device inside the instrument and is applied to the tape from a metering device directly before the analysis (wet-tape instruments).

These instruments have all the disadvantages of the dry-tape instruments and, in addition, are complicated by the introduction of the devices for storing and metering the reagent solution.

Known in the art are also gas ganalyzers with indicating vessels (liquid-type instruments) wherein the reagent solution is fed by special devices to the vessel either at preset time intervals or continuously. The analyzed air is bubbled through the vessel which is subsequently photometered by a photodetector. The results of the measurements can be recorded in the same way as in the tape-type instruments. After the measurement, the vessel must be washed and the solution reclaimed.

These instruments are more complicated than all the other known photocolorimetric gas analyzers.

Among the disadvantages of the liquid-type instruments the following are worth noting:
complicated design of the automatic instrument and low reliability owing to the presence of the devices for delivering the solution and analyzed air into the vessel, viz., pumps, metering devices, motors, valves, switches, etc;
short service life.

Besides, it is necessary to provide devices for periodical washing of the vessel and for cleaning the reagent solution of the chemical-reaction products between the reagent and the component being analyzed.

Also known are various devices utilizing indicating tubes and pencils.

In these devices for evaluating the concentration of the determined component the indicating tube is provided with means for depressurizing and delivering the analyzed air sample onto the indicating material. To these means usually belong hand-operated or automatic pumps (rubber bulbs, bellows pumps, electric-driven flow stimulators, etc.). Besides, the indicating tubes and pencils must be provided with a standard colour or linear scale for evaluating the results of the reaction while the pencil must additionally have the time-counting device because of the intensity of mark colouring depends both on the concentration of the toxic gas and on the time it acts on the mark, i.e. on the concentration effect dose.

The disadvantages of these devices, apart from those inherent in all the non-automatic instruments, are as follows:
inconvenience in use;
impossibility of employment for accurate measurements due to the random nature of the obtained results;
necessity for making a standard scale which possesses adequate metrological and operational characteristics (accuracy of colour reproduction, stability, etc.).

A disadvantage of the devices utilizing the indicating pencil also lies in the limited field of its application caused by the necessity of using some surface for making marks which is not always convenient and possible.

An object of the present invention is to provide a reliable, compact automatic photocolorimetric gas analyzer.

This object is acheived by providing a photocolorimetric gas analyzer in which electromagnetic radiation, acting on a sensitive element, is received by a radiation detector wherein, according to the invention, the sensitive element is made in the form of a tablet consisting of a uniform mixture of a reagent and a filler.

If repeated measurements are required, it is advisable that the gas analyzer be produced with means for removing the sensitive-element layer which has already reacted with a determined component of the gas mixture.

The photocolorimetric gas analyzer according to the invention has a simpler mechanism, smaller size, lighter weight and a higher reliability. It can be concluded from the above that the gas analyzer according to the invention is characterized by considerably better metrological, operational and economical parameters, viz., higher sensitivity and accuracy, wider measurement range, smaller size and weight, longer term of storage, lower cost and higher reliability.

Now the invention will be described in detail by way of examples with reference to the appended drawings in which.

The photocolorimetric gas analyzer according to the invention comprises a sensitive element 1 (FIG. 1) which consists of a reagent which is selective to a determined component of the gas mixture and a filler which is inert to the reagent and the gas mixture.

Figure 1:
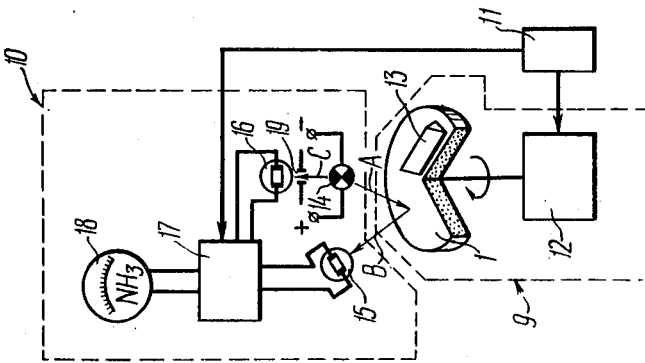
FIG. 1 is a block diagram of one embodiment of the photocolorimetric gas analyzer.
Figure 2:
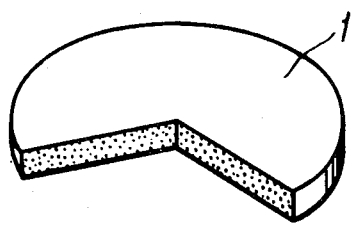
FIG. 2 shows the sensitive element of a photocolorimetric gas analyzer according to FIG. 1 in the form of a tablet consisting of a uniform mixture of a reagent and a filler (axonometric projection)

The sensitive element 1 (FIGS. 1 and 2) is made as a tablet consisting of a uniform mixture of a reagent and a filler which is clearly seen in FIG. 2. The tablet is gastight in depth for the gas mixture being analyzed.

In an exemplary embodiment of the invention the selective analysis of the water vapours (determined component) is made by using the powdered reagent and filler, namely double-water cobalt diiodide $CoI_2.2H_2O$ and polyethylene, respectively.

Due to the fact that this reagent is reversible which means that the chemical composition and optical properties of the element surface depend only upon the concentration of water vapours (relative humidity), there is no need to reclaim the surface during repeated measurements which simplifies substantially the structure of the gas analyzer.

In another embodiment of the invention selective analysis of ammonia is made with the aid of the powdered reagent and filler, namely, bromophenol blue $C_{19}H_{10}Br_4O_5S$ and polyethylene, respectively.

In a further embodiment of the invention selective analysis of hydrogen sulphide is made with the aid of the powdered reagent and filler, namely, lead acetate $(CH_3COO)_2Pb.3H_2O$ and polyethylene, respectively.

In a still further embodiment of the invention the selective analysis of nitrogen oxides is made also with the aid of the powdered reagent and filler, namely, benzidine $C_{12}H_{12}N_2$ and polyethylene, respectively.

For carrying out a selective analysis of several components of a gas mixture, e.g., ammonia, nitrogen dioxide and hydrogen sulphide, the photocolorimetric gas analyzer according to the invention comprises a sensitive element 2 (FIG. 3) made similarly to the sensitive element 1 (FIG. 2), the difference being in that the sensitive element 2 (FIGS. 3 and 4) consists of a number of sections, namely, three sections 3, 4, 5 comprising, each, a reagent which is selective to the determined component of the gas mixture and a filler which is inert to the reagent and gas mixture. In the described element of the invention section 3 is intended to analyze ammonia $NH_3$, section 4 analyzes nitrogen oxides (nitrogen dioxide $NO_2$) and section 5 analyzes hydrogen sulphide $H_2S$. Section 3 consists of a powdered reagent and a molten filler, i.e. bromophenol blue and wax, respectively, section 4 consists of a molten reagent and filler, i.e. N-phenylantranil acid and wax, respectively, and section 5 consists of a molten reagent and a powdered filler i.e. lead acetate and silica gel, respectively.

For the selective analysis of hydrogen sulphide, the photocolorimetric gas analyzer according to the invention comprises a sensitive element 6 (FIGS. 5 and 6) in the form of a tablet consisting of two sections 7 and 8.

Section 7 is a working section consisting of a uniform mixture of the powdered reagent and the filler. The reagent is lead acetate $(CH_3COO)_2Pb.3H_2O$ and the filler is polyethylene.

Section 8 is a reference section which contains a pigment and a filler which are inert to each other and to the analyzed gas mixture and which are selected such that the reflection factor of the reference section 8 is equal to that of the working section 7 before or after its interaction with the determined component.

In a concrete embodiment of the invention the neutral pigment in section 8 is powdered barium sulphate $Ba_2SO_4$ and the filler is powdered polyethylene.

When the section contains equal parts of pigment and filler, the reflection factor of section 8 is equal to that of section 7 before the latter has interacted with the determined component.

In another concrete embodiment of the invention, the pigment and the filler in section 8 are powdered lead sulphide PbS and polyethylene, respectively.

When the proportion of the pigment to the filler is 1:2, the reflection factor of section 8 is equal to that of section 7 after the latter has interacted with a fixed dose of the determined component.

So far a form of the sensitive element 6 has been described comprising one reference section 8. However, a sensitive element may have more than one reference section and be used for the selective analysis of several components. The working and reference sections can be arranged in any required order. Due to its simplicity and similarity this sensitive element of the photocolorimetric gas analyzer is not shown in the drawings.

The photocolorimetric gas analyzer according to the invention (FIG. 1), based on the sensitive element 1 and intended for the selective analysis of ammonia, water vapours, hydrogen sulphide and nitrogen oxides, comprises a concentration sensor 9, a unit 10 for measuring the reflection factor and a control unit 11 electrically connected with the sensor 9 and the measuring unit 10.

The sensor 9 for measuring the concentration of any one of the above gases comprises a sensitive element 1 (FIG. 2) made as described above and linked kinematically with an electric motor 12 for rotating the sensitive element 1 and a means 13 for removing the used layer of the sensitive element 1 to enable repeated measurements, the remaining means being made in the form of a scraper knife arranged above the sensitive element 1.

The measuring unit 10 comprises a source of radiation 14 in the form of an incandescent lamp connected to a D.C. mains, the electromagnetic radiation of this lamp being directed along arrow A at the sensitive element 1. In accordance with the sensitive element 1, the unit 10 has one measuring channel comprising a working radiation detector 15 and a reference radiation detector 16; the former receives radiation in the direction of arrow B after interaction with the sensitive element 1 whereas the reference radiation detector 16 receives radiation directly from the source 14 in the direction of arrow C.

The radiation detectors 15 and 16 serve as the arms of a measuring bridge 17 whose diagonal is connected to an indicating instrument 18 in the form of a microammeter. The indicating instrument can also be constituted by an automatic recorder.

Placed in front of the reference radiation detector 16 is a variable disphragm 19 for setting the measuring bridge 17.

Figure 7:
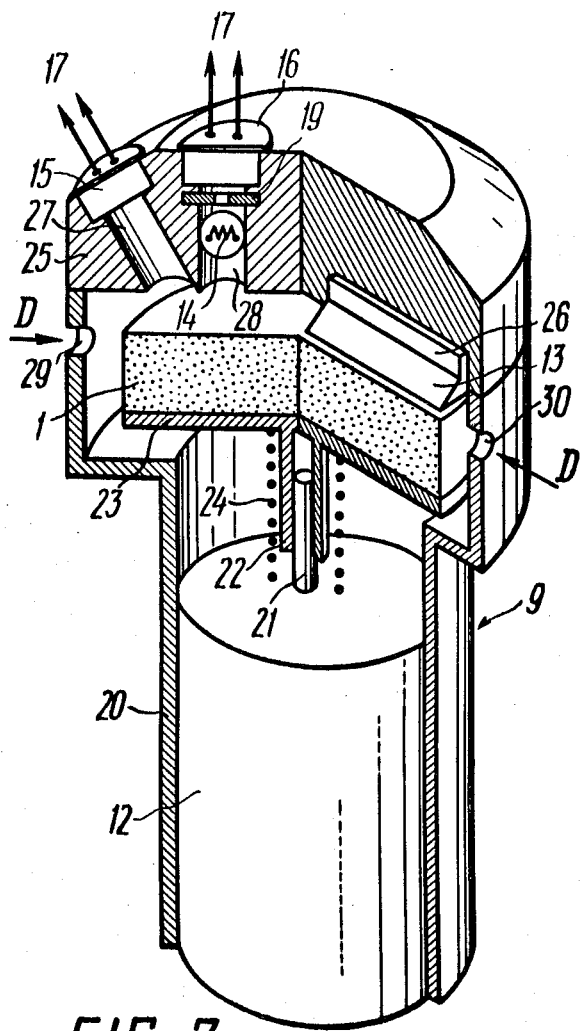
FIg. 7 shows the sensor and, partly, the measuring unit of the photocolorimetric gas analyzer shown in FIG. 1 (axonometric projection)

The design of the sensor 9 and, partly, of the measuring unit 10 of the photocolorimetric gas analyzer according to the invention shown in FIG. 1 is illustrated in FIG. 7.

It can be seen that a cylindrical body 20 of the sensor 9, consisting of two cylinders of different diameters, accommodates the electric motor 12 in the cylinder of the smaller diameter, an output shaft 21 of said motor carrying a bushing 22 with a holder 23 for the sensitive element 1 located on the cylinder of the larger diameter which allows rotation of the sensitive element. The bushing 22 is provided with a spring 24 for pressing the sensitive element 1 against the scraper knife 13 (removing means).

A cover 25 of the body 20 mounts knife 13 for removing the used layer of the sensitive element 1, the knife being secured by a plate 26. The cover 25 has channels 27 and 28; the channel 27 accommodates the working radiation detector 15 whereas the channel 28 houses the source of radiation 14, located directly above the sensitive element 1, the reference radiation detector 16 and the variable diaphragm 19.

The body 20 has holes 29 and 30 located at the opposite ends of the larger cylinder diameter, these holes admitting the analyzed gas mixture which is directed towards the surface of the sensitive element 1 along arrows D.

The elementary electric diagram (FIG. 8) of the photocolorimetric gas analyzer according to the invention (as shown in FIG. 1) is only one of the versions of its possible electrical circuitry. While a specific embodiment of the invention is shown in this diagram, it will be understood that various modifications and changes within the spirit and scope of the invention may be made by those skilled in the art.

The measuring bridge 17 (FIG. 1) of the measuring unit 10 (FIG. 8) comprises radiation detectors 15 and 16, a loading resistor 31 and potentiometers 32 and 33 serving, respectively for balancing the measuring bridge 17 and setting the end of the scale during calibration of the gas analyzer. The indicating instrument 18 is cut into the diagonal of the bridge 17 through contacts 34 of a relay 35.

The control unit 11 comprises the following functional units:

an asymmetric multivibrator (transistors 36, 37, a capacitor 38, and resistors 39, 40, 41, 42 and 43);

a pulse transformer 44;

two pulse-shaping amplifiers (transistors 45 and 46);

two integrating cells (resistors 47 and 48, a capacitor 49, a potentiometer 50, diodes 51 and 52 and resistors 53 and 54, a potentiometer 55, a capacitor 56, diodes 57 and 58);

two actuating devices (a resistor 59, a thyristor 60, a relay 35 with contacts 34, 61 and 62 and a resistor 63, a thyristor 64, a relay 65 with contacts 66);

a tumbler switch 67 and a push-button 68.

Figure 8:
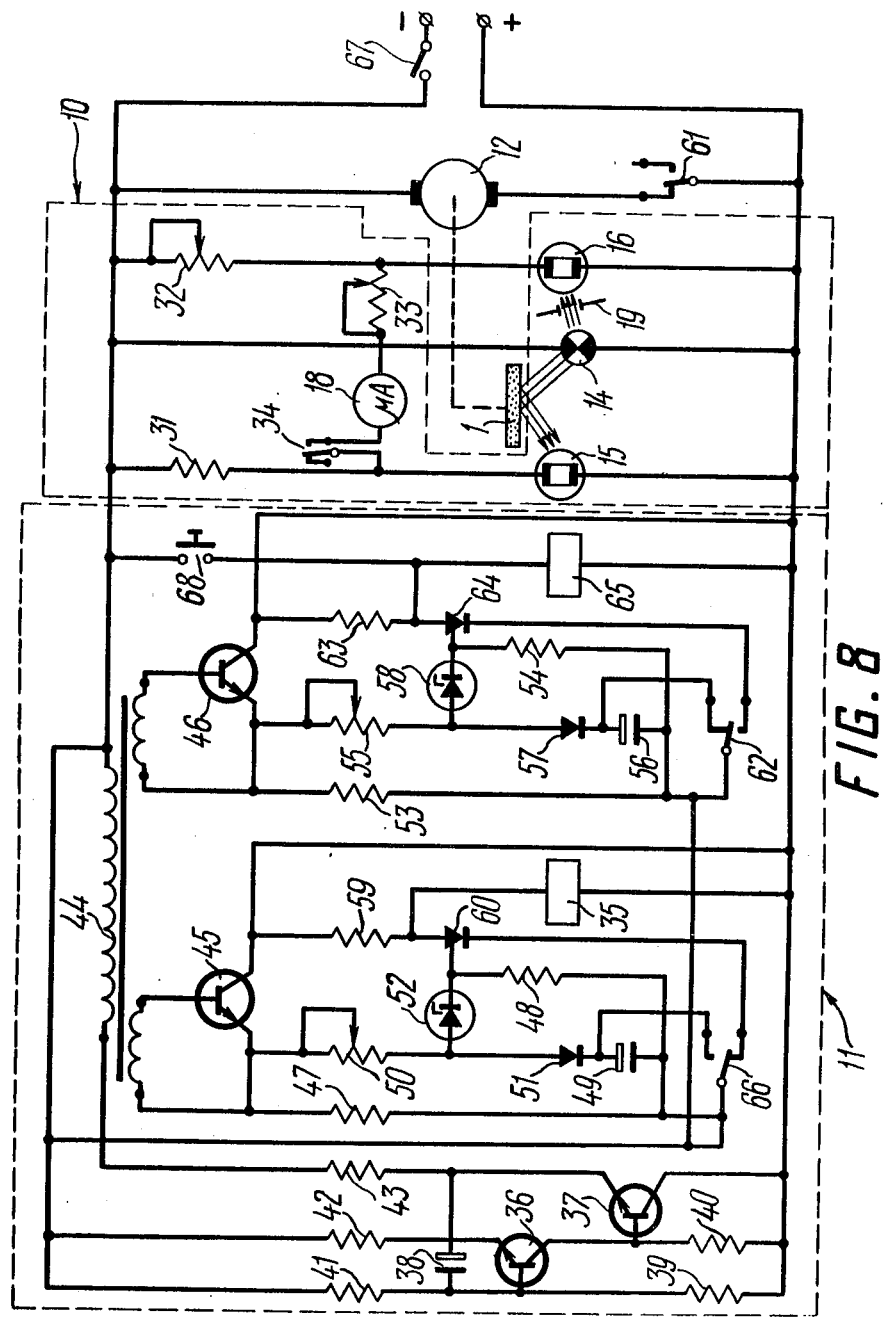
FIG. 8 is an elementary electric diagram of the measuring and control units of the photocolorimetric gas analyzer shown in FIG. 1.

As shown in FIG. 8, the main units and components of the electric circuit are interconnected in the following sequence. The secondary windings of the transformer 44 are connected to the inputs of the pulse-shaping amplifiers (transistors 45 and 46). The outputs of these amplifiers are connected to the inputs of the integrating cells (potentiometer 50, diode 51, capacitor 49 and potentiometer 55, diode 57, capacitor 56) whose outputs are in turn connected through diodes 52 and 58 with the control electrodes of thyristors 60 and 64 whose loads (resistors 59 and 63) are used to send commands controlling the operation of the gas analyzer.

The output of the asymmetric multivibrator (transistors 36, 37, capacitor 38, resistors 39, 40, 41, 42 and 43) is connected to the input of the pulse transformer 44. The asymmetric multivibrator serves as a master oscillator generating rectangular pulses.

A similar layout of the control unit is described in the magazine "Instruments and Experimental Techniques", Academy of Sciences of the USSR, No. 5, Moscow, pp 156–157.

Figure 3:
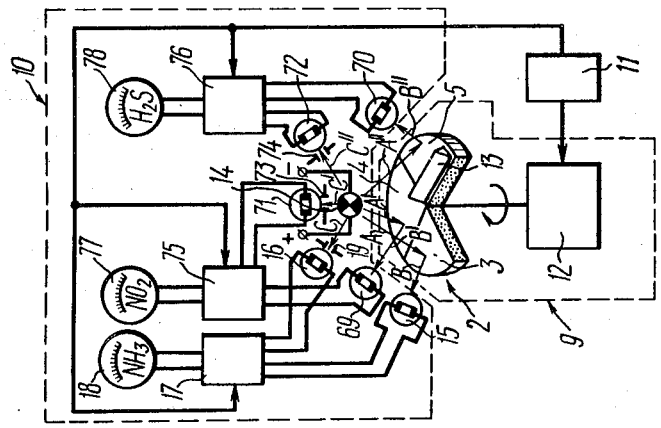
FIG. 3 is a block diagram of a second embodiment of the photocolorimetric gas analyzer.
Figure 4:
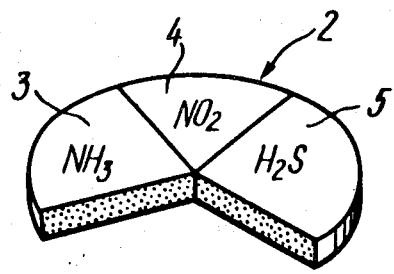
FIG. 4 shows the sensitive element of the photocolorimetric gas analyzer which consists of a number of sections containing the appropriate reagent and filler and which is intended for the simultaneous analysis of several components of a gas mixture, e.g., ammonia, nitrogen oxides and hydrogen sulphide (axonometric projection)

For better lucidity of the following discussion related to the operation of the gas analyzer according to FIG. 3, working radiation detectors in the second and third measuring channels are designated by numerals 69, 70 reference radiation detectors — 71, 72, variable diaphragms — 73, 74, measuring bridges — 75, 76 and indicating instruments — 77, 78.

The direction of the incident radiation received by the sections 4 and 5 of the sensitive element 2 (FIG. 4) is shown, respectively by arrows $A^I$ and $A^{II}$, that of the reflected radiation by arrows $B^I$ and $B^{II}$ while the direction of the radiation received by the reference radiation detectors 71 and 72 is indicated by arrows $C^I$ and $C^{II}$.

Figure 5:
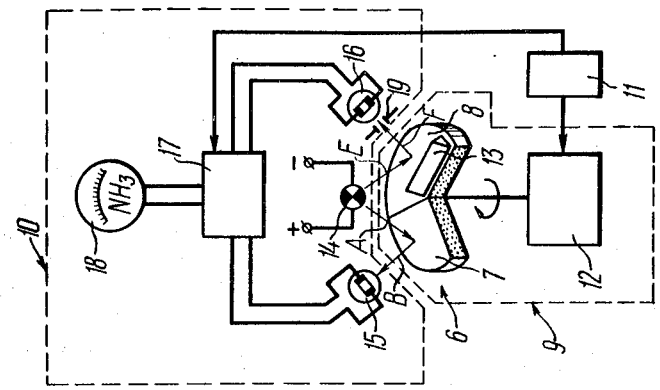
FIg. 5 is a block diagram of a third embodiment of the photocolorimetric gas analyzer.
Figure 6:
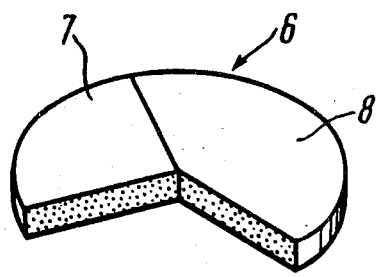
FIG. 6 shows the sensitive element of the photocolorimetric gas analyzer in FIG. 5 comprising a working section and a reference section (axonometric projection)

The reference radiation in the photocolorimetric gas analyzer according to FIG. 5 for analyzing hydrogen sulphide is constituted by the radiation reflected from the reference section 8 of the sensitive element 6 in FIG. 6 made as described above.

The radiation emitted by the source of radiation 14 falls on the reference section 8 of the sensitive element 6 along arrow E, is reflected by the surface of the section and, passing through the variable diaphragm 19, falls on the reference radiation detector 16 along arrow F.

The operating principle of the photocolorimetric gas analyzer according to the invention, as illustrated in FIG. 1, consists in the following. Let us consider in detail the operation of a gas analyzer for the selective analysis of ammonia as an example. On closing the tumbler switch 67 (FIG. 6), D.C. power is supplied to the asymmetric multivibrator (transistors 36, 37, capacitor 38, resistors 39, 40, 41, 42 and 43) of the control unit 11, to the measuring unit 10 and the electronic motor 12.

The load of the asymmetric multivibrator is constituted by the pulse transformer 44 which has as many secondary windings as there are commands required.

For the automatic operation of the gas analyzer there must be two commands:

1. Preparation of the surface of the sensitive element 1 for measurement;
2. Measurement within a preset period of time.

After energizing the gas analyzer, the control unit 11 is brought to the initial position by pressing the push-button 68. This actuates the relay 65 whose contacts 66 shunt the normally unshunted capacitor 49. When the button 68 is released, the relay 65 is deenergized and unshunts the capacitor 49 which starts being charged. The capacitor charging time ensures the necessary delay of the command for preparation of the sensitive element 1 for measurements. In the ammonia gas analyzer considered here this time amounts to approximately three seconds. Simultaneously, the supply voltage is fed to the electric motor 12 through the contacts 61 of the relay 35. As a result, the bushing 22 carried by the shaft of the electric motor 12 (FIG. 7) and the holder 23 with the sensitive element 1 being rotating constantly pressed by the spring 24 against the stationary scraper knife 13.

Thus, the upper layer of the element is removed to the required depth, previously, determined by way of experiment (in the sensitive element for ammonia analysis this depth is 0.05 mm). This depth is ensured by the preset number of revolutions of the sensitive element 1 or, in case of a constant rotation speed, by the operating time of the electric motor 12, i.e. by the duration of the first command of the control unit 11.

The radiant flux of the source of radiation 14 reflected by the cleaned surface of the element 1 is received by the working radiation detector 15 along arrow B.

The intensity of the radiant flux falling on the reference radiation detector 16 from the same source 14 is set in advance so as to ensure a zero unbalance of the measuring bridge 17 with the cleaned surface of the element 1. Structurally, this can be achieved by various methods such as, in this case, by diaphragming the radiant flux falling on the radiation detector 16 when the optical system of the gas analyzer is adjusted by means of the variable diaphragm 19.

While the sensitive element 1 is being prepared for measurements the indicating instrument 18 is cut off. On termination of the charge of the capacitor 49 (FIG. 8) the thyristor 60 operates and, simultaneously, the contacts 34 of the relay 35 cut in the indicating instrument 18, while its contacts 62 unshunt the capacitor 56, and its contacts 61 open the supply circuit of the electric motor 12.

This forms the second command of the control unit 11 for measurement. The capacitor 56 begins to be charged.

The time of its charge ensures the time delay of the second command. In the ammonia gas analyzer considered here this time is 2 minutes, the flow rate of the analyzed air (gas mixture) being 30 l/hr.

If the analyzed air contains the determined component and, due to its adsorption and chemical interaction with the reagent of the element 1 (FIG. 1), the reflection factor of the element surface changes proportionally to the concentration of the determined component and the time of its action on the element 1. This unbalances the measuring bridge 17 and the current generated in its diagonal becomes proportional to the changes that have occurred on the surface of the element 1.

This current is shown by the indicating instrument 18. The time required to expose the element 1 to the analyzed air is determined in advance during calibration of the gas analyzer on reference concentrations and is given in the form of the second command of the control unit 11.

Admission of the analyzed air to the surface of the element 1 and the end of its supply can be ensured structurally by various known devices such as valves, pumps, etc. so that there is no need to describe this operation here.

On termination of the charge of the capacitor 56 (FIG. 8), the thyristor 64 operates and so does the relay 65 whose contacts 66 shunt the capacitor 49. The relay 35 is deenergized, cutting off the indicating instrument 18 and the relay contacts 61 cut in the electric motor 12. Concurrently, the contacts 62 of the relay 35 shunt the capacitor 56 while the relay 65 is deenergized and its contacts 66 unshunt the capacitor 49 which again begins to be charged. In this way the operating cycle of the gas analyzer is automatically repeated according to a time program.

If necessary, the gas analyzer can be provided with a device for positive delivery of an air sample (gas flow stimulator, ejector, pump, etc.). In this case it can be made in the form of, say, a turbine mounted on the shaft of the same electric motor 12.

The gas analyzer considered here utilizes the so-called amplitude method of concentration measurement wherein the concentration is determined by the amplitude (unbalance of the measuring bridge 17 (FIG. 1) with the fixed time of contact of the sensitive element 1 with the analyzed medium (or with a fixed volume of air).

If the contact time is not fixed, the concentration effect dose can be determined by graduating the scale of the indicating instrument in dose units.

Realization of other methods is also possible. For example, concentration can be measured by the time of change of the output signal (or of the volume of the analyzed air) to a preset value which is selected in advance during calibration (time method). The longer this time the lower the concentration of the determined component.

The operating principle of the photocolorimetric gas analyzer according to FIG. 1 for the analysis of other gases is identical with that of the ammonia gas analyzer described above. The sole difference lies in the duration of the second command of the control unit 11.

The operation principle of the photocolorimetric gas analyzer according to FIG. 3 also differs from that described above only in the duration of the second command of the control unit 11 and in that the measurements are taken simultaneously through three channels.

The operating principle of the photocolorimetric gas analyzer according to FIG. 5 is the same as that of the gas analyzer according to FIG. 1.

Owing to the use of a sensitive element in the form of a tablet and of a means (knife) for removing the used layer of the sensitive surface, the photocolorimetric gas analyzer according to the invention is characterized by high sensitivity and accuracy, long life, higher reliability, small size and light weight.

We claim:

1. A photocolorimetric analyzer for testing gas mixtures having several components, the analyzer comprising a sensitive element made in the form of a gas-impermeable tablet consisting of a mixture of a selective reagent and an inert filler, and changing optical properties of its surface layer as a result of reaction between the reagent and one of the components of the gas mixture being analyzed; means for mechanically removing the surface layer, said means being made in the form of a scraper contacting the surface layer; power means to produce relative movement of the sensitive element and the scraper; a radiation source located on the side of the surface layer; a radiation detector to convert radiation reflected from the surface layer into an electrical signal; means for measuring the latter; and a control unit electrically connected with said removing means and with said measuring means, for controlling said lastnamed two means according to a preset program.

* * * * *